(12) United States Patent
Shah et al.

(10) Patent No.: US 10,540,111 B2
(45) Date of Patent: Jan. 21, 2020

(54) MANAGING DATA CONTAINER INSTANCES IN A DISPERSED STORAGE NETWORK

(71) Applicant: International Business Machines Corporation, Armonk, NY (US)

(72) Inventors: Rohan P. Shah, Chicago, IL (US); Harsha Hegde, Hawthorn Woods, IL (US); Wesley B. Leggette, Chicago, IL (US); Daniel J. Scholl, Chicago, IL (US); Jason K. Resch, Chicago, IL (US); Yogesh R. Vedpathak, Chicago, IL (US); Manish Motwani, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 15/635,901

(22) Filed: Jun. 28, 2017

(65) Prior Publication Data

US 2019/0004725 A1    Jan. 3, 2019

(51) Int. Cl.
*G06F 3/06* (2006.01)
*G06F 11/10* (2006.01)

(52) U.S. Cl.
CPC ............ *G06F 3/0641* (2013.01); *G06F 3/061* (2013.01); *G06F 3/067* (2013.01); *G06F 3/0608* (2013.01);
(Continued)

(58) Field of Classification Search
CPC .... G06F 3/0641; G06F 3/0608; G06F 3/0619; G06F 3/067; G06F 3/061; G06F 3/0611; G06F 3/0613; G06F 3/0617; G06F 3/0631; G06F 3/0629; G06F 3/0614; G06F 3/065; G06F 3/0647; G06F 3/0652; G06F 3/0604; G06F 9/50; G06F 9/5011; G06F 9/5016; G06F 9/5022; G06F 9/5072; G06F 9/5083; G06F 11/1076
See application file for complete search history.

(56) References Cited

U.S. PATENT DOCUMENTS 4,092,732 A    5/1978 Ouchi
5,454,101 A    9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Michael Krofcheck
(74) *Attorney, Agent, or Firm* — Garlick & Markison; Timothy W. Markison; Bruce E. Stuckman

(57) ABSTRACT

A method for execution by a container instance manager (CIM) includes determining to create a new instance of a first data container, where the first data container is stored in a first memory location. Creation of the new instance of the first data container for storage in a second memory location is facilitated in response to the determining to create the new instance. The method further includes determining to remove a duplicate instance of a second data container. Deletion of the duplicate instance of the second data container from memory is facilitated in response to the determining to remove the duplicate instance.

20 Claims, 6 Drawing Sheets

(52) U.S. Cl.
CPC .......... *G06F 3/0619* (2013.01); *G06F 3/0631* (2013.01); *G06F 11/1076* (2013.01); *G06F 3/0652* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,634,497 | B2 | 12/2009 | Passerini et al. |
| 7,636,724 | B2 | 12/2009 | de la Torre et al. |
| 8,185,614 | B2 | 5/2012 | Leggette et al. |
| 8,555,109 | B2 | 10/2013 | Dhuse et al. |
| 9,292,385 | B2 | 3/2016 | Leggette et al. |
| 2002/0062422 | A1 | 5/2002 | Butterworth et al. |
| 2002/0133491 | A1 | 9/2002 | Sim et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0199566 | A1 | 10/2004 | Carlson et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2006/0230403 | A1 | 10/2006 | Crawford et al. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0281230 | A1 | 11/2010 | Rabii et al. |
| 2011/0071621 | A1 | 3/2011 | Fomenko et al. |
| 2011/0161712 | A1* | 6/2011 | Athalye .................. G06F 1/206 713/340 |
| 2011/0252181 | A1* | 10/2011 | Ouye ..................... G06F 3/0613 711/101 |
| 2012/0030424 | A1* | 2/2012 | Nunez .................. G06F 3/0617 711/114 |
| 2012/0290868 | A1* | 11/2012 | Gladwin ............. G06F 11/0727 714/4.1 |
| 2012/0303913 | A1* | 11/2012 | Kathmann ............ G06F 3/0607 711/162 |
| 2013/0346540 | A1* | 12/2013 | Dean .................. H04L 67/1097 709/214 |
| 2014/0344645 | A1 | 11/2014 | Gladwin et al. |
| 2015/0378616 | A1* | 12/2015 | Khadiwala ........... G06F 3/0659 711/114 |
| 2018/0246668 | A1* | 8/2018 | Sakashita ............. G06F 3/0604 |
| 2018/0270125 | A1* | 9/2018 | Jain .................... H04L 67/1097 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

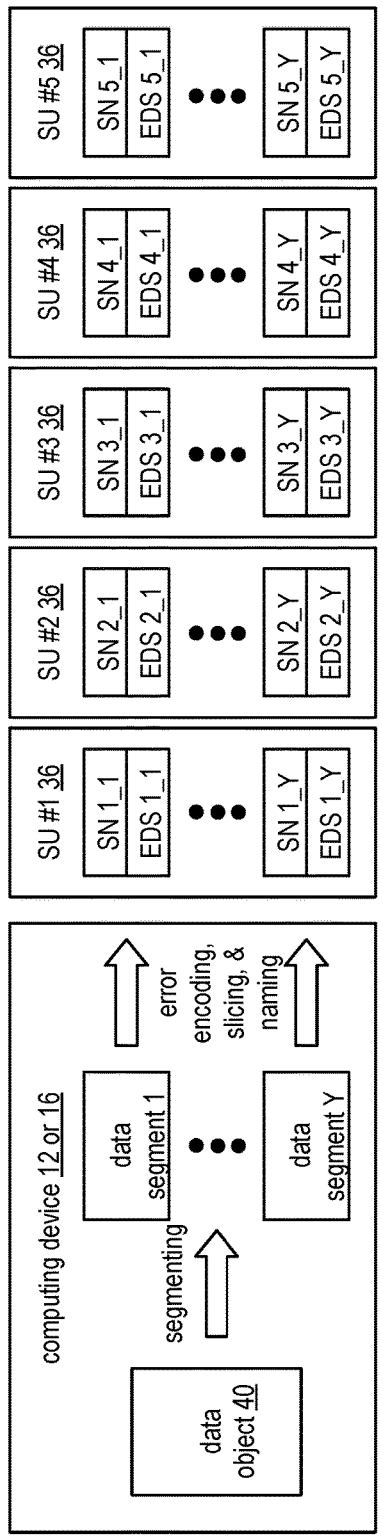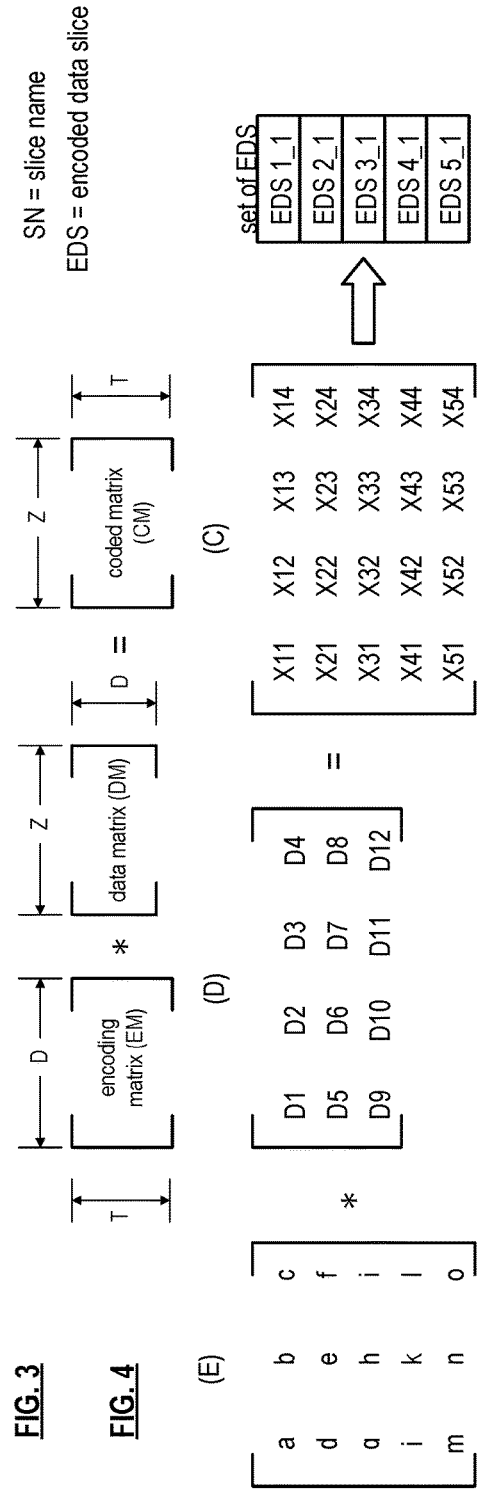

MANAGING DATA CONTAINER INSTANCES IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
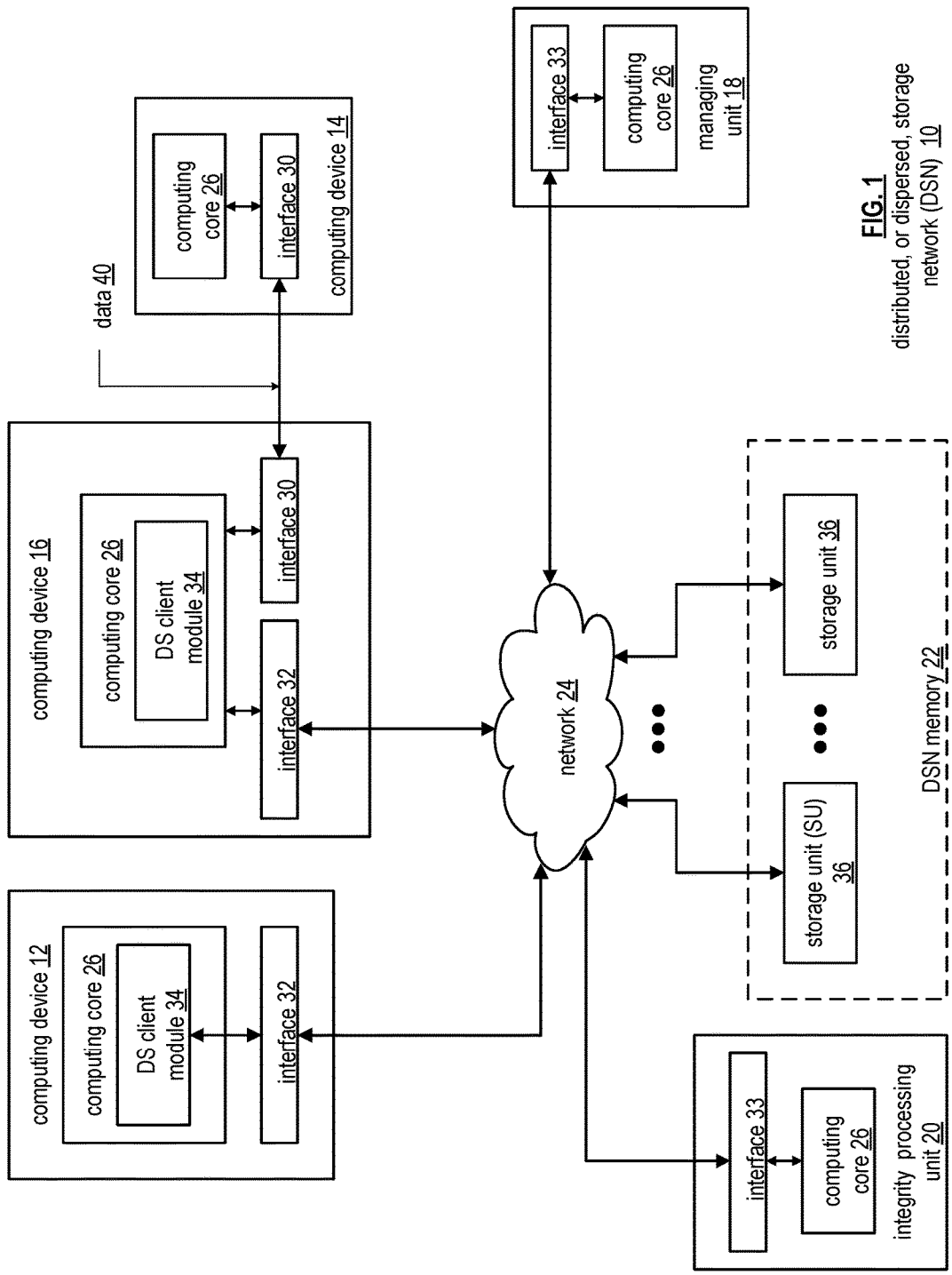
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
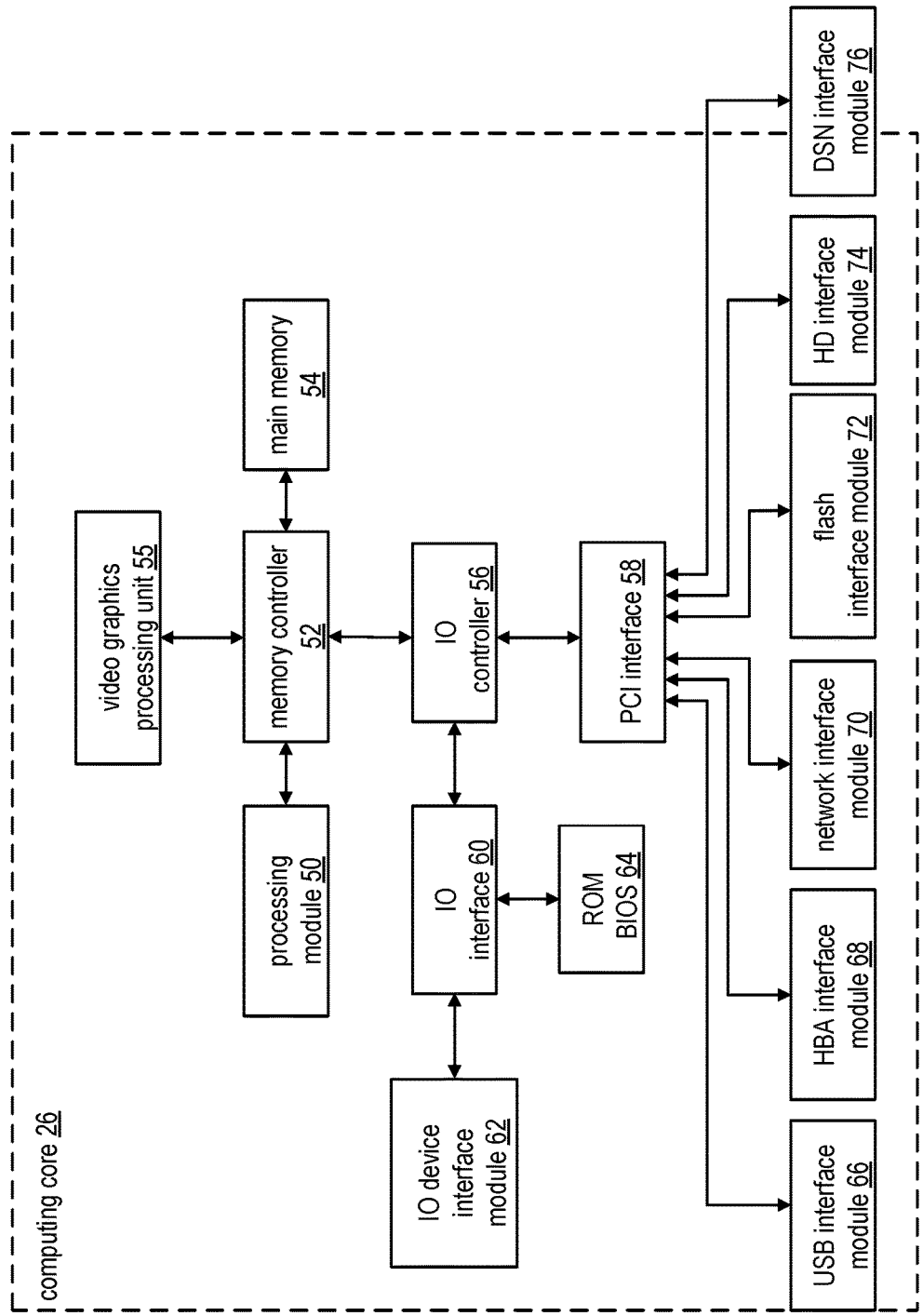
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
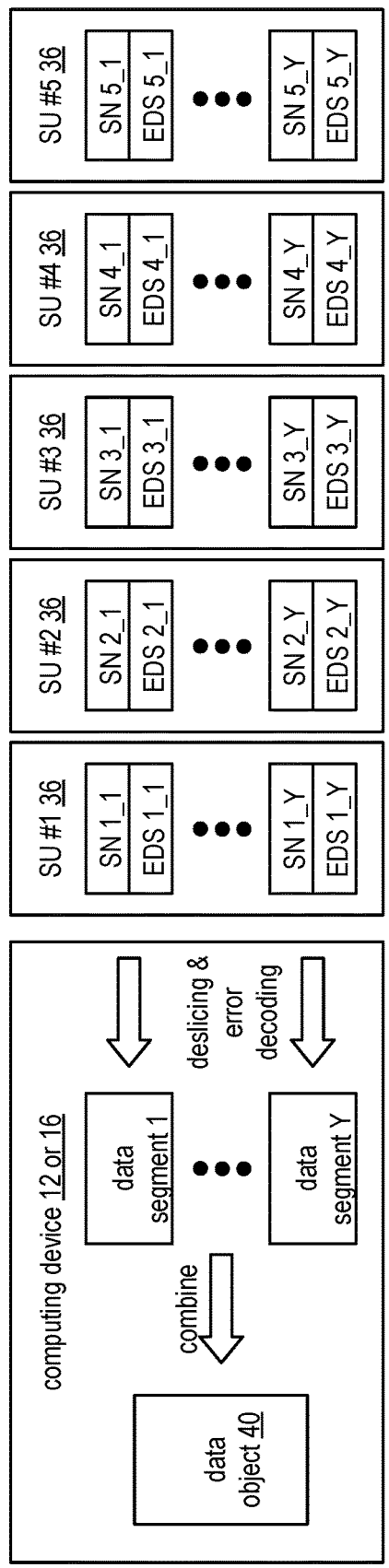
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
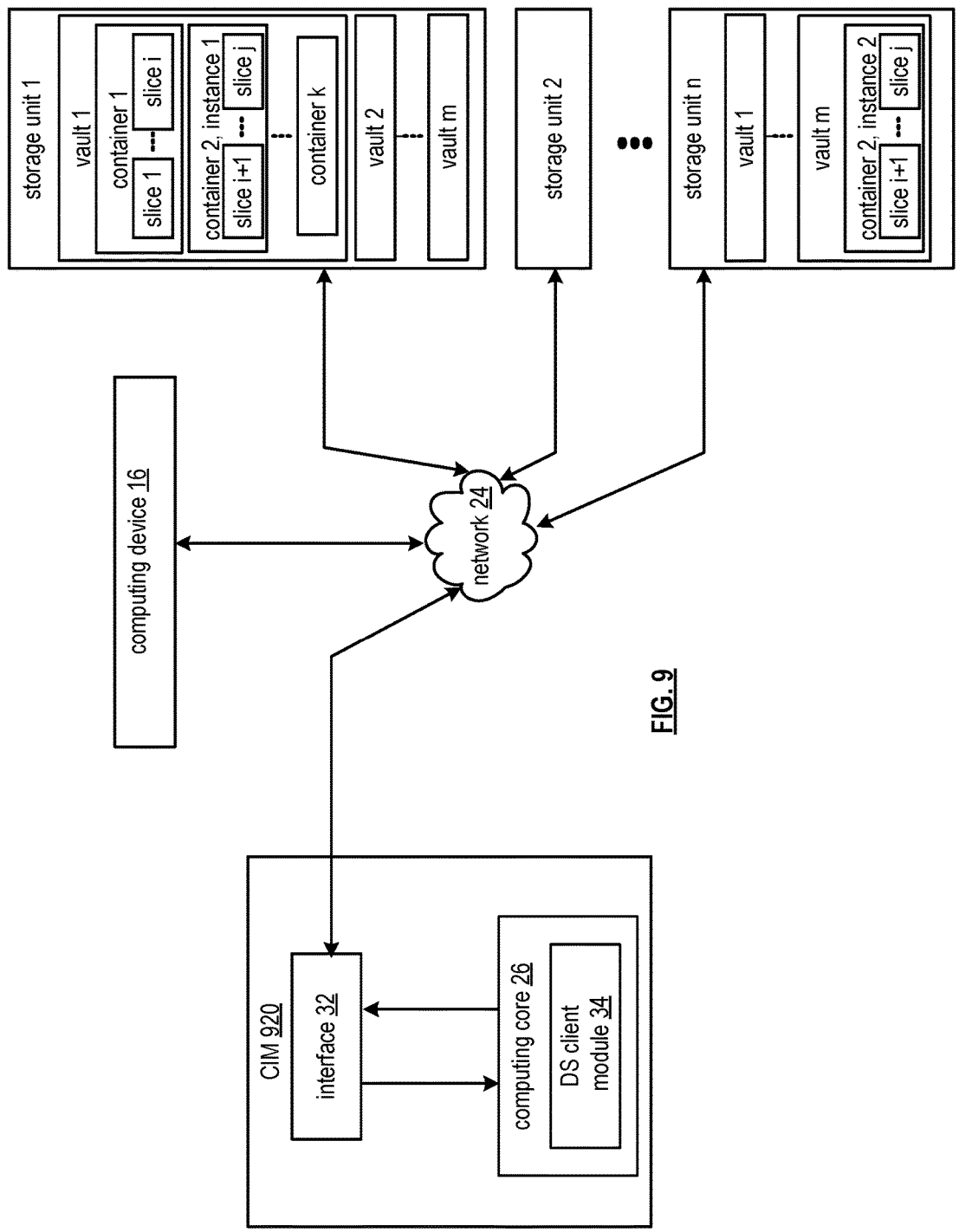
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a container instance manager (CIM) 920, computing device 16 of FIG. 1, the network 24 of FIG. 1, and a plurality of storage units 1-n. The CIM 920 can include the interface 32 of FIG. 1, the computing core 26 of FIG. 1, and the DS client module 34 of FIG. 1. The computing device 16 can function as a dispersed storage processing agent for computing device 14 as described previously, and may hereafter be interchangeably referred to as a distributed storage and task (DST) processing unit. Each storage unit may be implemented utilizing the storage unit 36 of FIG. 1.

Each storage unit can store data slices in a plurality of vaults 1-*m*, and each vault can include a plurality of data containers 1-*k*, which can each include at least one slice stored in the vault. Each storage unit can include the same or different number of vaults, and each vault can include the same or different number of data containers. Each data container can encapsulate its own data, such as a set of data slices. For example, as shown in FIG. 9, a set of j slices are divided between container 1 and container 2 of vault 1 of storage unit 1, where i is less than j, and the slices can be ordered or unordered. As used herein, a data container can physically or virtually store or otherwise encapsulate a set of slices, files, or other data, for example, included in the same vault of a storage unit. For example, a vault can include a plurality of containers responsible for mutually exclusive, collectively exhaustive encapsulation of the plurality of data slices stored in a vault, as depicted in FIG. 9. Each container can include the same number or different number of slices, and some or all containers can be responsible for encapsulating a single data slice. Some or all containers can be assigned a static amount of memory, for example, based on a designated number of slices, based on a fixed namespace of slices for which it is responsible, and/or based on a designated proportion of the memory device or vault on which it lives. Alternatively, or in addition, some or all containers can have dynamic memory size, for example, changing based as data that is added or removed from the container, varying sizes of slices in its corresponding namespace, and/or based on other factors. While not depicted in FIG. 9, as used herein, a container can include any amount of data across the same or different memory devices and/or vaults of a storage unit. In various embodiments, a container can include data across multiple storage units, for example, encompassing all the slices of one or more data objects across their corresponding storage units. For example, a container can include a subset of slices, memory devices, and/or vaults of a plurality of storage units. Containers of the DSN can be mutually exclusive sets of data or can include overlapping sets of data, for example, where some data slices are included in multiple, non-duplicate containers. DSN functions to manage data container instances. In particular, the DSN functions to add or remove duplicate data container instances.

It is can be desirable to have multiple instances of a data container to meet varying objectives. For example, a copy of a container may be desired in multiple geographic locations for greater availability or decreased access latency. A copy of a container may also be desired to serve as a redundant copy that can be used for disaster recovery or to serve as a snapshot of a container at an instant in time. Moreover, these copies may be desired irrespective of deployment scenario or configurations. The decision to create, maintain, or remove instances of containers in an DSN memory may be made by a requester in the system, based on the requesters needs or legal compliance reasons. Thus, multiple instances of containers can be stored across different memory devices, vaults, or storage units of the DSN, for example, where duplicate containers are stored on different storage units in different geographic sites. As depicted in FIG. 9, a container 2, instance 1 is stored in vault 1 of storage unit 1, and container 2, instance 2 is stored in vault m of storage unit n.

In a DSN memory, a Container Instance Manager (CIM) can determine when to create new instances of data containers, or remove duplicate instances of data containers, and execute these decisions. By having a CIM decide when to make a container copy and where to make the copy of the container, while monitoring for events, a DSN memory is able to ensure data is highly available for access, disaster recovery or to serve as snapshot without user intervention or manual monitoring for favorable conditions.

The CIM can determine the need to create additional instances based on one or more of: the locations from which access requests to the container originate (e.g. as determined by network address/host); identities of the requests as determined from authentication information; provided request metadata included as part of the access requests; exceeding a threshold level for access failures to a container (e.g. more than 1% of requests fail; changes in entities authorized to access the container; frequent data loss events, or instances of coming close to data loss (e.g. 1 slice loss away from IDA threshold such as a pillar width, decode threshold number, read threshold number, and/or a write threshold number of the IDA); high level of rebuilding load/activity for the container; and/or inability for storage units or DST processing units to keep up with request load to the container. As an example, one or more data objects could be at or below width in a container, thereby triggering a rebuild action. The rebuilding action might fail to bring the data object to full width due to one or more reasons, resulting in the object remaining below width. The CIM in this case may initiate an action to create a copy of the container to another vault and storage pool, wherein the storage unit availability will enable a complete rebuild of that data.

In some instances, the CIM may determine that a container instance should be moved to another vault within the same DSN memory and/or should be moved to another system another system (DSN memory or other). Alternatively, or in addition, the CIM may determine that the container requires a mirror container instance. A CIM and/or DS processing unit can make such determinations based on one or more of: the number of storage pools on the system; available storage space; the number of sites across which a storage pool is deployed; the typical access pattern or historical access patterns to the given container; and/or the ability and need to mirror the container; the ability to proxy to an alternate DSN memory (e.g. determining whether agreements in place and access permissions are favorable). For example, a CIM could decide to create a copy of the container on another storage pool via a mirror for a 2 site deployment.

The CIM can complete the creation of one or more instances of the container in the background. The DS processing unit can synchronize data in the background as requests come in to update and modify the source data. For any requests to the container copy, the DS processing unit could proxy by using the available source data and redirecting requests as appropriate while waiting for the container copy to become in synch with the source data.

Conversely, when a CIM determines that a reliability, availability, or performance level is sufficient, or too high, and that the cost of the additional container instances is not worth the excess reliability, availability, or performance level, the CIM may determine to remove at least one instance of a container (if two or more exist). The CIM will optimize for removing the instance that is least needed/most expensive, for example, by removing the instance from the vault/storage pool that has the least amount of free space and/or from the vault/storage pool that has the most expensive bandwidth, or is least local from the typical access locations.

In various embodiments, a processing system of a container instance manager (CIM) includes at least one processor and a memory that stores operational instructions, that when executed by the at least one processor cause the processing system to determine to create a new instance of a first data container, where the first data container is located in a first memory location. Creation of the new instance of the first data container for storage in a second memory location is facilitated in response to the determining to create the new instance. The operational instructions further cause the processing system to determine to remove a duplicate instance of a second data container. Deletion of the duplicate instance of the second data container from memory is facilitated in response to the determining to remove the duplicate instance.

In various embodiments, a plurality of locations from which a plurality of access requests to the first data container originate are evaluated. Determining to create the new instance of the first data container is based on the evaluation of the plurality of locations, and the second memory location is determined based on the plurality of locations. In various embodiments, determining to create the new instance of the first data container is based on identities of a plurality of access requests to the first data container determined based on authentication information and/or changes in entities authorized to access the first data container. In various embodiments, determining to create the new instance of the first data container is based on determining that an access failure level to the first data container exceeds an access failure threshold and/or determining a level of rebuilding load of the first data container exceeds a rebuilding load threshold.

In various embodiments, the determining to create the new instance of the first data container is based on determining that only a threshold number of data slices above a corresponding information dispersal algorithm threshold are currently stored for a corresponding data object, where the first data container includes at least one data slice of the corresponding data object. In various embodiments a rebuilding action for the data object is facilitated, where the rebuilding action is performed by utilizing copies of the at least one data slice of the data object stored in the new instance of the first data container.

In various embodiments, the new instance of the first data container is created in response to determining to move the first data container to the second memory location. The deletion of the first data container from the first memory location is facilitated. In various embodiments, determining to move the first data container to the second memory location is based on a number of geographic sites across which a storage pool is deployed, a typical access pattern of the first data container, and/or a historical access pattern of the first data container.

In various embodiments, a DST processing unit serves as a proxy for requests to the new instance of the first data container by using available source data and by redirecting requests during a temporal period between a first time of initiation of the creation of the new instance of the first data container and second time of completion of the creation of the new instance of the first data container. In various embodiments, a DST processing unit synchronizes write requests to data of the first data container by updating the new instance of the first data container accordingly during a temporal period between a first time of initiation of the creation of the new instance of the first data container and second time of completion of the creation of the new instance of the first data container.

In various embodiments, determining to remove the duplicate instance of a second data container is based on determining that a performance level exceeds a performance level threshold. In various embodiments, determining to remove the duplicate instance of a second data container includes evaluating a plurality of duplicate instances of the second data container and selecting the duplicate instance from the plurality of duplicate instances in response to determining at least one of: the duplicate instance has a smallest amount of free space of the plurality of duplicate instances or the duplicate instance has a most expensive bandwidth of the plurality of duplicate instances.

Figure 10:
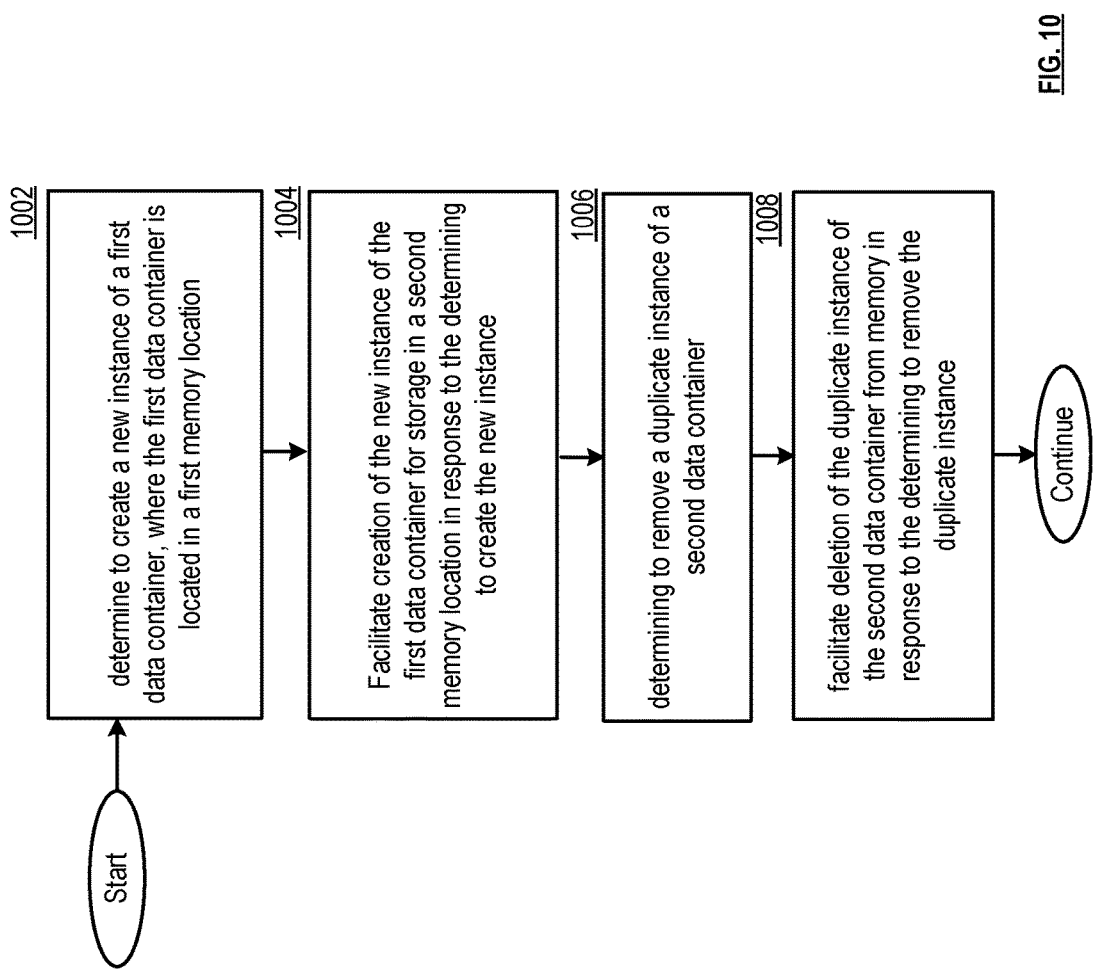
FIG. 10 is a logic diagram of an example of a method of managing data container instances in accordance with the present invention.

FIG. 10 is a flowchart illustrating an example of managing container instances In particular, a method is presented for use in association with one or more functions and features described in conjunction with FIGS. 1-9, for execution by a container instance manager (CIM) that includes a processor or via another processing system of a dispersed storage network that includes at least one processor and memory that stores instruction that configure the processor or processors to perform the steps described below. Step 1002 includes determining to create a new instance of a first data container, where the first data container is located in a first memory location. Step 1004 includes facilitating creation of the new instance of the first data container for storage in a second memory location in response to the determining to create the new instance. Step 1006 includes determining to remove a duplicate instance of a second data container. Step 1008 includes facilitating deletion of the duplicate instance of the second data container from memory in response to the determining to remove the duplicate instance.

In various embodiments, a processing system of a container instance manager (CIM) includes at least one processor and a memory that stores operational instructions, that when executed by the at least one processor cause the processing system to determine to create a new instance of a first data container, where the first data container is located in a first memory location. Creation of the new instance of the first data container for storage in a second memory location is facilitated in response to the determining to create the new instance. The operational instructions further cause the processing system to determine to remove a duplicate instance of a second data container. Deletion of the duplicate instance of the second data container from memory is facilitated in response to the determining to remove the duplicate instance.

In various embodiments, a plurality of locations from which a plurality of access requests to the first data container originate are evaluated. Determining to create the new instance of the first data container is based on the evaluation of the plurality of locations, and the second memory location is determined based on the plurality of locations. In various embodiments, determining to create the new instance of the first data container is based on identities of a plurality of access requests to the first data container determined based on authentication information and/or changes in entities authorized to access the first data container. In various embodiments, determining to create the new instance of the first data container is based on determining that an access failure level to the first data container exceeds an access failure threshold and/or determining a level of rebuilding load of the first data container exceeds a rebuilding load threshold.

In various embodiments, the determining to create the new instance of the first data container is based on determining that only a threshold number of data slices above a corresponding information dispersal algorithm threshold are currently stored for a corresponding data object, where the first data container includes at least one data slice of the corresponding data object. In various embodiments a rebuilding action for the data object is facilitated, where the rebuilding action is performed by utilizing copies of the at least one data slice of the data object stored in the new instance of the first data container.

In various embodiments, the new instance of the first data container is created in response to determining to move the first data container to the second memory location. The deletion of the first data container from the first memory location is facilitated. In various embodiments, determining to move the first data container to the second memory location is based on a number of geographic sites across which a storage pool is deployed, a typical access pattern of the first data container, and/or a historical access pattern of the first data container.

In various embodiments, a DST processing unit proxies requests to the new instance of the first data container by using available source data and by redirecting requests during a temporal period between a first time of initiation of the creation of the new instance of the first data container and second time of completion of the creation of the new instance of the first data container. In various embodiments, a DST processing unit synchronizes write requests to data of the first data container by updating the new instance of the first data container accordingly during a temporal period between a first time of initiation of the creation of the new instance of the first data container and second time of completion of the creation of the new instance of the first data container.

In various embodiments, determining to remove the duplicate instance of a second data container is based on determining that a performance level exceeds a performance level threshold. In various embodiments, determining to remove the duplicate instance of a second data container includes evaluating a plurality of duplicate instances of the second data container and selecting the duplicate instance from the plurality of duplicate instances in response to determining at least one of: the duplicate instance has a smallest amount of free space of the plurality of duplicate instances or the duplicate instance has a most expensive bandwidth of the plurality of duplicate instances.

In various embodiments, a non-transitory computer readable storage medium includes at least one memory section that stores operational instructions that, when executed by a processing system of a dispersed storage network (DSN) that includes a processor and a memory, causes the processing system to determine to create a new instance of a first data container, where the first data container is located in a first memory location. Creation of the new instance of the first data container for storage in a second memory location is facilitated in response to the determining to create the new instance. The operational instructions further cause the processing system to determine to remove a duplicate instance of a second data container. Deletion of the duplicate instance of the second data container from memory is facilitated in response to the determining to remove the duplicate instance.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a container instance manager (CIM) that includes a processor, the method comprises:
    determining to create a new instance of a first data container, wherein the first data container is stored in a first memory location;
    facilitating creation of the new instance of the first data container for storage in a second memory location in response to the determining to create the new instance;
    determining to remove a duplicate instance of a second data container, wherein determining to remove the duplicate instance of the second data container includes evaluating a plurality of duplicate instances of the second data container and selecting the duplicate instance from the plurality of duplicate instances in response to determining at least one of: the duplicate instance has a smallest amount of free space of the plurality of duplicate instances or the duplicate instance has a most expensive bandwidth of the plurality of duplicate instances; and
    facilitating deletion of the duplicate instance of the second data container from memory in response to the determining to remove the duplicate instance.

2. The method of claim 1, further comprising:
    evaluating a plurality of locations from which a plurality of access requests to the first data container originate;
    wherein determining to create the new instance of the first data container is based on the evaluation of the plurality of locations, and wherein the second memory location is determined based on the plurality of locations.

3. The method of claim 1, wherein determining to create the new instance of the first data container is based on changes in entities authorized to access the first data container.

4. The method of claim 1, wherein determining to create the new instance of the first data container is based on determining that a percentage of failed accesses to the first data container that failed exceeds an access failure threshold.

5. The method of claim 1, wherein determining to create the new instance of the first data container is based on determining that only a threshold number of data slices above a corresponding information dispersal algorithm threshold are currently stored for a corresponding data object, wherein the first data container includes at least one data slice of the corresponding data object.

6. The method of claim 5, further comprising:
facilitating a rebuilding action for the data object, wherein the rebuilding action is performed by utilizing copies of the at least one data slice of the data object stored in the new instance of the first data container.

7. The method of claim 1, wherein the new instance of the first data container is created in response to determining to move the first data container to the second memory location, further comprising:
facilitating the deletion of the first data container from the first memory location.

8. The method of claim 7, wherein determining to move the first data container to the second memory location is based on at least one of: a number of geographic sites across which a storage pool is deployed, a typical access pattern of the first data container, or a historical access pattern of the first data container.

9. The method of claim 1, wherein a dispersed storage and task (DST) processing unit proxies requests to the new instance of the first data container by using available source data and by redirecting requests during a temporal period between a first time of initiation of the creation of the new instance of the first data container and second time of completion of the creation of the new instance of the first data container.

10. The method of claim 1, wherein a dispersed storage and task (DST) processing unit synchronizes write requests to data of the first data container by updating the new instance of the first data container accordingly during a temporal period between a first time of initiation of the creation of the new instance of the first data container and second time of completion of the creation of the new instance of the first data container.

11. The method of claim 1, wherein determining to remove the duplicate instance of the second data container is based on determining that a performance level exceeds a performance level threshold.

12. The method of claim 1, wherein determining to create the new instance of the first data container is based on determining a level of rebuilding load of the first data container exceeds a rebuilding load threshold.

13. A processing system of a container instance manager (CIM) comprises:
at least one processor;
a memory that stores operational instructions, that when executed by the at least one processor cause the processing system to:
determine to create a new instance of a first data container, wherein the first data container is stored in a first memory location;
facilitate creation of the new instance of the first data container for storage in a second memory location in response to the determining to create the new instance;
determine to remove a duplicate instance of a second data container, wherein determining to remove the duplicate instance of the second data container includes evaluating a plurality of duplicate instances of the second data container and selecting the duplicate instance from the plurality of duplicate instances in response to determining at least one of: the duplicate instance has a smallest amount of free space of the plurality of duplicate instances or the duplicate instance has a most expensive bandwidth of the plurality of duplicate instances; and
facilitate deletion of the duplicate instance of the second data container from memory in response to the determining to remove the duplicate instance.

14. The processing system of claim 13, wherein the operational instructions, when executed by the at least one processor, further cause the processing system to:
evaluate a plurality of locations from which a plurality of access requests to the first data container originate;
wherein determining to create the new instance of the first data container is based on the evaluation of the plurality of locations, and wherein the second memory location is determined based on the plurality of locations.

15. The processing system of claim 13, wherein determining to create the new instance of the first data container is based on determining that only a threshold number of data slices above a corresponding information dispersal algorithm threshold are currently stored for a corresponding data object, wherein the first data container includes at least one data slice of the corresponding data object.

16. The processing system of claim 15, wherein the operational instructions, when executed by the at least one processor, further cause the processing system to:
facilitate a rebuilding action for the data object, wherein the rebuilding action is performed by utilizing copies of the at least one data slice of the data object stored in the new instance of the first data container.

17. The processing system of claim 13, wherein the new instance of the first data container is created in response to determining to move the first data container to the second memory location, and wherein the operational instructions, when executed by the at least one processor, further cause the processing system to:
facilitate the deletion of the first data container from the first memory location.

18. The processing system of claim 13, wherein a dispersed storage and task (DST) processing unit synchronizes write requests to data of the first data container by updating the new instance of the first data container accordingly during a temporal period between a first time of initiation of the creation of the new instance of the first data container and second time of completion of the creation of the new instance of the first data container.

19. The processing system of claim 13, wherein determining to create the new instance of the first data container is based on determining a level of rebuilding load of the first data container exceeds a rebuilding load threshold.

20. A non-transitory computer readable storage medium comprises:
at least one memory section that stores operational instructions that, when executed by a processing system of a dispersed storage network (DSN) that includes a processor and a memory, causes the processing system to:

determine to create a new instance of a first data container, wherein the first data container is stored in a first memory location;

facilitate creation of the new instance of the first data container for storage in a second memory location in response to the determining to create the new instance;

determine to remove a duplicate instance of a second data container wherein determining to remove the duplicate instance of the second data container includes evaluating a plurality of duplicate instances of the second data container and selecting the duplicate instance from the plurality of duplicate instances in response to determining at least one of: the duplicate instance has a smallest amount of free space of the plurality of duplicate instances or the duplicate instance has a most expensive bandwidth of the plurality of duplicate instances; and facilitate deletion of the duplicate instance of the second data container from memory in response to the determining to remove the duplicate instance.

* * * * *